US007323425B2

(12) United States Patent
Chu et al.

(10) Patent No.: US 7,323,425 B2
(45) Date of Patent: Jan. 29, 2008

(54) CROSSLINKING OF HYALURONAN SOLUTIONS AND NANOFIBEROUS MEMBRANES MADE THEREFROM

(75) Inventors: Benjamin Chu, Setauket, NY (US); Benjamin S. Hsaio, Setauket, NY (US); Dufei Fang, Painted Post, NY (US); Akio Okamoto, Kanagawa (JP)

(73) Assignee: Stony Brook Technology and Applied Research, Stony Brook, NY (US)

( * ) Notice: Subject to any disclaimer, the term of this patent is extended or adjusted under 35 U.S.C. 154(b) by 262 days.

(21) Appl. No.: 10/927,094

(22) Filed: Aug. 27, 2004

(65) Prior Publication Data
US 2006/0046590 A1  Mar. 2, 2006

(51) Int. Cl.
*A61F 2/00* (2006.01)
*D04H 1/00* (2006.01)

(52) U.S. Cl. ............... 442/327; 424/424; 424/425; 442/333

(58) Field of Classification Search ............... 442/327, 442/333; 424/424, 425
See application file for complete search history.

(56) References Cited

U.S. PATENT DOCUMENTS

| 5,520,916 A | * | 5/1996 | Dorigatti et al. ............ 424/402 |
| 7,049,434 B2 | * | 5/2006 | Mariotti et al. ............ 536/55.2 |
| 2004/0102124 A1 | | 5/2004 | Suzuki |

* cited by examiner

*Primary Examiner*—Lynda Salvatore
(74) *Attorney, Agent, or Firm*—Oblon, Spivak, McClelland, Maier & Neustadt, P.C.

(57) ABSTRACT

A method for producing a non-chemically crosslinked hyaluronan is provided which involves contacting a sample of hyaluronan with an acidic solvent/water mixture for a period of time and at a temperature sufficient to effect crosslinking, wherein the acidic solvent/water mixture has a content of a solvent sufficient to prevent dissolution of said hyaluronan and wherein the solvent is miscible with water, and an amount of an acid sufficient to effect crosslinking of the hyaluronan, and the crosslinked, water resistant non-woven hyaluronan resulting therefrom.

2 Claims, 15 Drawing Sheets

CROSSLINKING OF HYALURONAN SOLUTIONS AND NANOFIBEROUS MEMBRANES MADE THEREFROM

BACKGROUND OF THE INVENTION

1. Field of Invention

The present invention relates to methods for crosslinking hyaluronan solutions and nanofibrous membranes without the use of additional chemical cross-linking agent.

2. Discussion of the Background

Hyaluronan (HA) is an associated polymer, having the following structure:

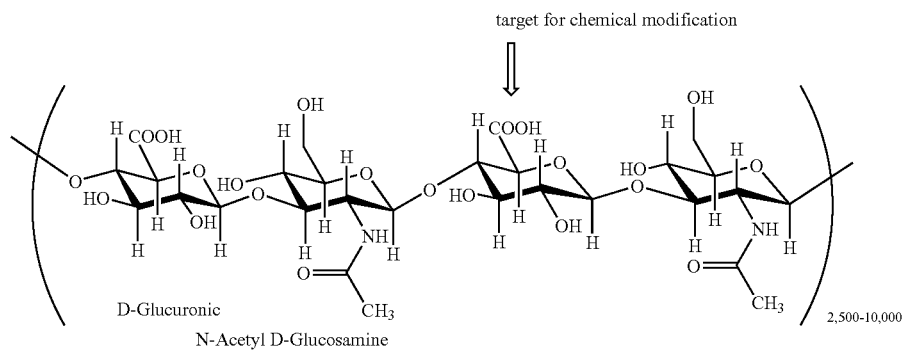

HA has an acidic group as well as a glucosamine segment. As shown above, HA is a linear polysaccharide consisting of alternating 1,4-linked units of 1,3-linked glucoronic acid and N-acetylglucosamine. The presence of the weak acid group makes the polymer a polyelectrolyte, i.e., its charge density depends on the degree of dissociation, that can be influenced by factors including, but not limited to:

pH
ionic strength
nature of co-ions and counter ions
solvent quality that shall also affect the above 3 conditions.

The degree of association can be disturbed by physical and/or chemical means. For example:

By physical means, e.g., ultra-sonics, shear, microwave, etc.
By chemical means, such as complex formation with a liquid, e.g., polyethylene oxide is soluble in water because of its hydrogen bonding with water.

The occurrence of HA is widespread in animals and bacteria, particularly in synovial fluid, vitreous humor, rooster comb, and the umbilical cord. HA is a polyanionic acid that has unique physicochemical properties and distinctive biological functions. Its unusually high viscosity has been utilized for surgical treatments in ophthalmology as a viscoelastic biomaterial protecting ocular cells from damage during the surgery.[1-7] The lubricious polysaccharide is also used in orthopedics for the treatment of osteoarthritis of the knee through injection of the aqueous solution.[8-11] In addition, HA is applied in cosmetics to prevent the skin from drying because of its high retention ability[12] and in drug delivery systems because of its biodegradability.[13-16]

Although HA can be produced on a large scale by biotechnology,[17] applications of HA are still limited because the hydrophilic HA can be readily dissolved in water and undergoes relatively rapid biodegradation in vivo. Many attempts have been made to introduce cross-linking sites into HA molecules to produce insoluble or gel-like HA materials. The cross-linking reagents used in previous studies included diopeoxy,[18] glutaraldehyde,[19] carbodiimide[20,21] and disulfide.[22]

Unfortunately, conventional chemical modifications and subsequent cross-linking of HA have an inevitable problem of extra risks, such as toxicity and bio-incompatibility intrinsic to most chemical modifications. However, one method of producing HA gels by freezing and thawing acidic aqueous solution of HA has been proposed in a US patent (U.S. Pat. No. 6,387,413B1)[23]. The obtained HA gel kept its shape for at least one day in a neutral aqueous solution at 25° C.

Previously, the present inventors successfully prepared electrospun HA nanofiber membranes by a blowing-assisted electro-spinning method.[24] However, such electro-spun HA nano-fibrous membranes, due to the very large surface-to-volume ratios, dissolve instantly in water. Accordingly, a pathway is needed to fabricate hydrophilic, but essentially water-resistant, electro-spun HA membranes without chemical modifications.

REFERENCES

1. Balazs, E. A. and Pape, L. G., The use of sodium hyaluronate (Healon@) in human anterior segment surgery. Ophthalmology, 1980,87,699-705.
2. Gerke, E., Meyer-Schwickerath, E. and Wessing, A. Healon in rebnal detachment with proliferative vitreoretinopathy. Graefe's Arch Clin Exp Ophthalmol, 1984,221, 241-243.
3. Maguen, E., Nesburn, A. and Macy, J. I., Combined use of sodium hyaluronate and tissue adhesive in penetrating keratoplasty of corneal perforations. Ophthal Surg, 1984, 15,55-57.
4. Folk, J. C., Weigeist, T. A., Packer, A. J. and Howcroft, M. J., Sodium hyaluronate (Healon) in closed vitrectomy. Ophthal Surg, 1986, 17, 299-306.
5. Malson, T., Algvere, P., Ivert, L., Lindqvist, B., Selen G. and Stenkula S. Cross-linked hyaluronate gels for use in vitreous surgery. In Biomaterials and Clinical Applications, ed. A. Pizzoferrato, P. G. Marchetti, A. Ravaglioli and A. J. C. Lee. Elsevier Science, Amsterdam, 1987, pp. 345-348.
6. Burke, S., Sugar, J. and Farber, M. D., Comparison of the effects of two viscoelastic agents, Healon and Viscoat, on postoperative intraocular pressure after penetrating keratoplasty. Ophthal. Surg., 1999, 21, 821-826.
7. Anmarkrud, N., Elergaust, B. and Bulle, T., The effect of Healon and timolol on early postoperative intraocular pressure after extracapsular cataract extraction with implantation of posterior chamber lens. Acta Ophthalmol., 1992, 70, 96-100.
8. Punzi, L., Schiavlon, F., Ramonda, R., Malatesta, V. and Gambari, P., Inira-articular hyaluronic acid in the treatment of inflammatory and noninflammatory knee effusions. Curr Tiler Res, 1988, 43, 643-647.
9. Strachan, R. K., Simith, P. and Gardner, D. L., Hyaluronate in reumatology and orthopaedics: is there a role? Ann Rheum Dis, 1990,49,949-952.
10. Isdale, A. H., Hordon, L. D., Bird, H. A. and Wright, V., Intra-articular hyaluronate (Healon): a dose-ranging study in rheumatoid arthritis and osteoarthritis. J Drug. Devel., 199'1, 4, 93-99.
11. Iwata, H., Pharmacologic and clinical aspects of intraartitular injection of hyaluronate. Clin Orthop, 1993, 289, 285-291.
12. Francesco, D. V. and Aurelio, R., European Patent Application, EP-216,453, 1987.
13. Benedetti, L. M., Topp, E. M. and Stella, V. J., Microspheres of hyaluronic acid esters—fabrication methods and in vitro hydrocortisone release. J Control Rel, 1990, 13, 33-41.
14. Ghezzo, E., Benedetti, L., Rochira, M., Biviano, F. and Callegaro, L., Hyaluronan derivative microspheres as NGF delivery devices: preparation methods and in vitro release characterization. Int. J. Pharmacol., 87, 21-29 (1992).
15. Joshi, H. N., Stella, V. J. and Topp, E. M., Drug release from membranes of hyaluronic acid and its esters. J. Control. Rel., 20, 109-122 (1992).
16. Yui, N., Okano, T. and Sakurai, Y., Regulated release of drug microspheres from inflammation responsive degradable matrices of crosslinked hyaluronic acid. J. Control. Rel., 25, 133-143 (1993).
17. Morita, H. and Ushiyama, S., Japan Kokai Tokkyo Koho JP-A-6115698, 1986.
18. Tomihata, K. and Ikada, Y., Preparation of cross-linked hyaluronic acid films of low water content. Biomaterial 1997, 18, 189-195.
19. Tomihata, K. and Ikada, Y., Crosslinking of hyaluronic acid with glutaraldehyde. J. Polym. Sci.: Part A Polym. Chem., 1997, 35, 3553-3559.
20. Tomihata, K. and Ikada, Y., Crosslinking of hyaluronic acid with water-soluble carbodiimide. J Biomed Res, 1997, 37, 243-251.
21. Young, S. C., Sung, R. H., Young, M. L., Kang, W. S., Moon, H. P., Young, S. N., Studies on gelation-containing artificial skin: II. Preparation and charcterization of cross-linked gelatin-hyaluronate sponge. J Biomed Res, 1999, 48, 631-639.
22. Shu, X. Z., Liu, Y., Luo, Y., Roberts, M. C. and Prestwich, G. D., Disulfide cross-linked hyaluronan hydrogel. Biomacromolecules 2002, 3, 1304-1311. (For other chemically cross-linked HA, see also WO 2004/037,164; and U.S. Pat. Nos. 5,874,417 and 5,356,883)
23. Miyata, Y., Okamoto, A., Kawata, M., Oshima, K., Hashimoto, M., Arai, K., Sawada, T., Hyaluronic acid gel, A method of its production and medical material containing it. U.S. Pat. No. 6,387,413B1.
24. Um, I. C., Fang, D., Hsiao, B. S., Okamoto, A., Chu, B., Electro-spinning and elctro-blowing of hyaluronic acid. Biomolecules, in press.

SUMMARY OF THE INVENTION

Accordingly, one object of the present invention is to provide a method for production of hydrophilic, but substantially water-insoluble, HA.

A further object of the present invention is to provide a method for production of substantially water-insoluble hydrophilic HA, with a high effective viscosity but without significant chemical modification to the HA structure itself.

A further object of the present invention is to provide a non-chemically cross-linked HA that is substantially water-insoluble.

These and other objects of the invention have been satisfied by the discovery of a process for crosslinking hyaluronan, comprising:

contacting hyaluronan with an acidic solvent/water mixture (preferably lower alkyl alcohol/water mixture) for a period of time and at a temperature sufficient to effect crosslinking, wherein the acidic solvent/water mixture comprises a content of a solvent sufficient to prevent dissolution of the hyaluronan and wherein the solvent is miscible with water, and an amount of an acid sufficient to effect crosslinking of the hyaluronan; and the cross-linked hyaluronan produced therefrom.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
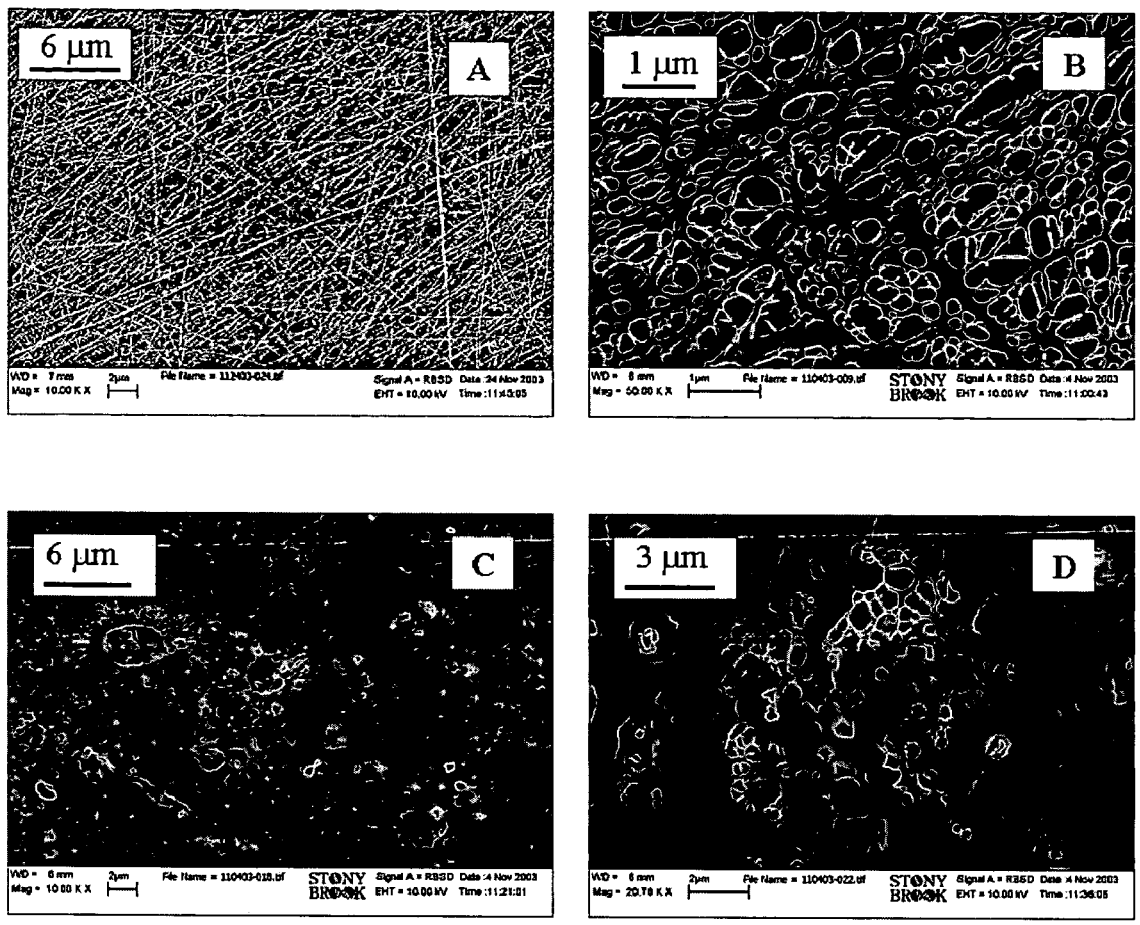
FIGS. 1(a)-(d) show SEM images of electro-spun HA membranes treated with HCL vapor from 37% (w/v) HCl (at a height of 5 cm) for: (a) 0 minute; (b) 5 minutes; (c) 7 minutes and (d) 10 minutes.

The present invention relates to a method for production of HA products that are substantially reduced in their water-solubility comprising contacting HA with an acidic solvent/water mixture (preferably alcohol/water mixture) having sufficient solvent present to prevent dissolution of the HA sample and for a time and at a temperature sufficient to effect crosslinking of the HA.

Within the context of the present invention, the term "chemically crosslinked" indicates that the polymer chains of HA have been connected by insertion of a chemical moiety, by reaction with a chemical crosslinking agent, such as carbo-diimide or glutaraldehyde. The term "crosslinked" as used in relation to the present invention, indicates that the polymer chains of HA have been connected without insertion of a chemical moiety, such as by an acid-based reaction between groups on two chains in proximity to one another.

The present invention process permits the preparation of HA nano-fibrous membranes that have greatly increased longevity in neutral water or in aqueous solutions without substantial degradation or dissolution.

In the present method, the initial HA sample is contacted with an acidic solution of a solvent/water mixture. The solvent used in the solvent/water mixture must be completely miscible with water and also must be compatible with use in biomedical applications (i.e. must be non-toxic in biomedical applications). Suitable preferred solvents include, but are not limited to, lower alkyl alcohols, dimethyl sulfoxide (DMSO), and dimethylformamide (DMF). A more preferred solvent/water mixture is a lower alkyl alcohol/water mixture, wherein the lower alkyl alcohol is present in an amount sufficient to prevent substantial dissolution (preferably no greater than about 10% by weight dissolution, more preferably no greater than about 5% by weight) of the initial HA sample in the mixture. As a lower alkyl alcohol useful in the present process, any of the alcohols having from 1 to 4 carbon atoms may be used, individually or as mixtures of two or more, including methanol, ethanol, n-propanol, i-propanol, n-butanol, s-butanol, t-butanol and their mixtures. More preferred alcohols of these are ethanol and methanol, with ethanol being most preferred The solvent/water mixture is made acidic with any protic acid, including organic and inorganic protic acids and mixtures thereof. The protic acid (and preferably its conjugate base) should be non-toxic with respect to use in biomedical applications. Suitable inorganic protic acids include, but are not limited to, hydrobromic acid (HBr), hydrochloric acid (HCl), sulfuric acid, nitric acid and their mixtures. Suitable organic protic acids include, but are not limited to, acetic acid, propionic acid, methane sulfonic acid, phosphoric acid and their mixtures. More preferred are the hydrohalic acids, with hydrochloric acid being most preferred.

In preparing the more preferred acidic alcohol/water mixture, the amount of alcohol is preferably 65 vol % or more, most preferably from 68-74 vol %, depending on the particular alcohol chosen. With the most preferred alcohol ethanol, the amount of ethanol in the ethanol/water mixture is preferably from 65-80 vol %, more preferably from 68-72 vol %, most preferably about 71 vol %.

The amount of acid used is again dependent on the particular acid chosen. For the most preferred hydrochloric acid, the acid is preferably used as a 37% (w/v) aqueous solution. Of this 37% (w/v) aqueous solution, it is preferred to use a ratio of alcohol:acid of from 3:1 to 5:1, most preferably from 4:1 to 5:1. This provides, for the most preferred ethanol embodiment, an amount of HCl from about 12% (w/v) to about 7.5% (w/v) of HCl in the final acidic alcohol/water mixture.

The process comprises bringing the uncrosslinked initial HA sample into contact with the acidic alcohol/water mixture under temperature conditions and for a time sufficient to effect crosslinking of the HA. The temperature for the reaction is preferably from greater than –20° C. to ambient temperature (approximately 25° C.), more preferably from –10 to 10° C., most preferably from 2 to 5° C. The time for contacting the HA with the acidic alcohol/water mixture is preferably from 60 min to 50 hours, more preferably from 10-25 hours, most preferably about 15-20 hours. Of course, the time for contacting the HA with the acidic alcohol/water mixture is dependent on the temperature, with lower temperatures requiring longer reaction times, and higher temperatures requiring shorter reaction times. Most preferably the reaction is performed by immersing the HA sample in the acidic alcohol/water solution at 0-10° C. for a period of about 15-25 hours.

The contacting step of the present process may be performed by immersion of the HA sample in the acidic alcohol/water mixture, or by continuous spraying of a stream or aerosol of the acidic alcohol/water mixture onto one or more sides of the HA sample. The HA sample itself may be in any form, including but not limited to, membranes, films or fibers. Membranes, films and fibers may be formed using any conventional process for forming HA membranes or films, such as casting or extrusion. Additionally, membranes and fibers may be prepared using the electro-blowing process described by the present inventors in U.S. application Ser. No. 10/674,464, filed Oct. 1, 2003, the contents of which are hereby incorporated by reference. The contacting step is more preferably performed by simple immersion of the sample into the acidic alcohol/water mixture for the desired time and at the desired temperature.

The HA sample may be hyaluronan, copolymers of hyaluronan and blends of hyaluronan with other polymers as indicated in U.S. application Ser. No. 10/674,464.

The crosslinked HA resulting from the present process preferably is a water resistant non-woven hyaluronan fibrous membrane having controlled void volume and mean pore size comprising:

a fibrous matrix, which comprises water-resistant hyaluronan fibers with an average fiber diameter in the range about 0.005 to about 10.0 micrometers, the membrane having a porosity in the range of about 30 to about 95 percent void volume and a mean pore size in the range of about 0.01 to about 100.0 micrometers.

The crosslinked HA resulting from the present process has significantly increased stability in neutral water. Un-crosslinked HA dissolves instantly in neutral water, whereas the crosslinked HA produced by the present process is stable for one week in neutral water.

EXAMPLES

Having generally described this invention, a further understanding can be obtained by reference to certain specific examples which are provided herein for purposes of illustration only and are not intended to be limiting unless otherwise specified.

Material

HA powders with an average molecular weight of $3.5 \times 10^6$ g/mole were provided by Denki Kagaku Kogyo Kabushiki Kaisha (Tokyo, Japan).

Preparation of Electro-Spun HA Membrane
1. HA concentration: 2.0~2.5% (w/v) HA in acidic aqueous solution (pH ~1.2)
2. Feeding rate: 35~45 μL/min
3. Electric field: 33 kV
4. Distance between the spinneret and collector: 10 cm
5. Heater power: 34 V
6. Air blowing rate and temperature: 50 ft$^3$/hr and ~55° C.

Preparation of HA Cast Film

HA cast films were prepared by casting the 1.5% (w/v) acidic aqueous solution of HA onto a clean glass plate, followed by drying at 25° C. for 3 days. The thickness of the HA cast film was about 100 μm.

Freezing of Acidic HA Solution

HA powder was dissolved in Mill-Q water to prepare a 1~2% (w/v) HA aqueous solution and then the pH of the solution was adjusted to 1.5 with 0.1N hydrochloride acid. This acidic solution was frozen at −20° C. over different time periods, ranging from 0 to 3, 6, 8, 10, 40 hours, and then thawed at 25° C. A 40-hour freezing period was used as a reference that yields a spongy HA gel.

Treatment of HA Film in Acidic Environments
1. HCl-vapor treatment

Electro-spun HA membrane or cast film was pasted onto the inner surface of a petri dish, and then placed on the top of a beaker (HA membrane or cast film side to the interior of the beaker) containing 10-ml HCl aqueous solution at different HCl concentrations. After several minutes of HCl vapor treatment, the film was taken out and kept in covered bottles in the freezer at −20° C. for a few weeks.
2. Electro-spun HA films were kept in a mixture of ethanol, 37% (w/v) HCl and water (or HA dilute solution) at different HCl concentrations and different temperatures for several days.

Microscopic Analysis

The LEO-1550 scanning electron microscope was used for SEM analysis.

Viscosity Measurements

Shear viscosity measurements of HA solutions were performed on a Rheometrix mechanical spectrometer (RMS, Model 605) at room temperature with a parallel plate (50 mm diameter) fixture. The intrinsic viscosity of diluted HA solution after freezing was measured in an Ubbelohde capillary viscometer at 25° C.

FT-IR Spectroscopic Characterization

FT-IR spectra measurements were performed with a Nicolet 760 spectrometer.

Results and Discussion

1. Cross-Linking of Electro-Spun HA Membrane by HCl-Vapor Treatment a) Optimization of HCl Vapor Treatment The Method to produce water-insoluble HA gels by freezing and thawing acidic aqueous solutions (pH ~1.5) of HA has been reported (U.S. Pat. No. 6,387,413B1). As the electro-spun HA membrane could be dissolved almost instantly in water, we tried to introduce the hydrochloric acid (HCl) into the membrane first by exposing the electro-spun HA membrane in HCl vapor.

FIG. 1 shows the morphology of the HA membrane treated with HCl vapor for different time periods. As shown, the HCl vapor coming from 37% (w/v) HCl solution can easily damage the fibrous structure of the HA membrane in a few minutes, suggesting a direction for decreasing the concentration of HCl solution.

Figure 2:
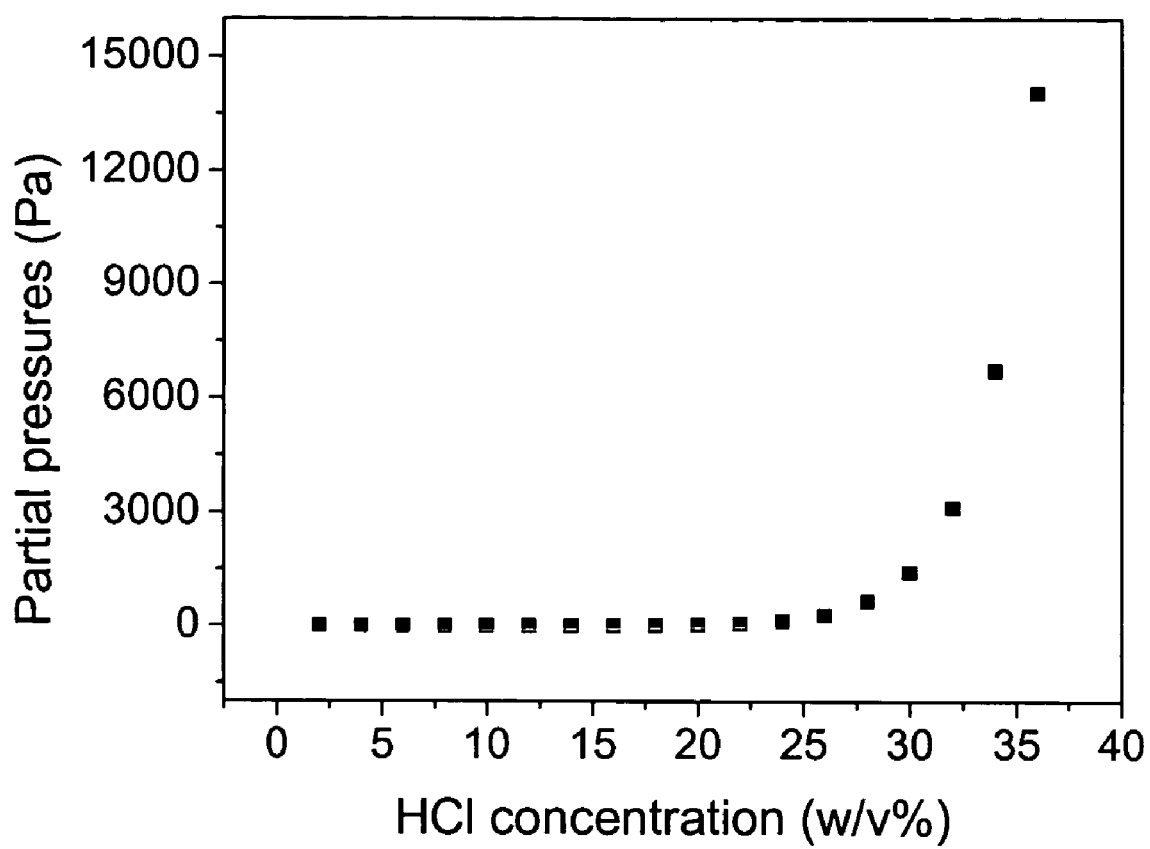
FIG. 2 is a graphical representation of the partial pressure of HCl over aqueous HCl solutions (Source: Chemical Safety Data Sheet SD-39. Properties and essential information for safe handling and use of hydrochloric acid, aqueous and hydrogen chloride, anhydrous. Manufacturing Chemist Association. Revised May 1970.)
Figure 3:
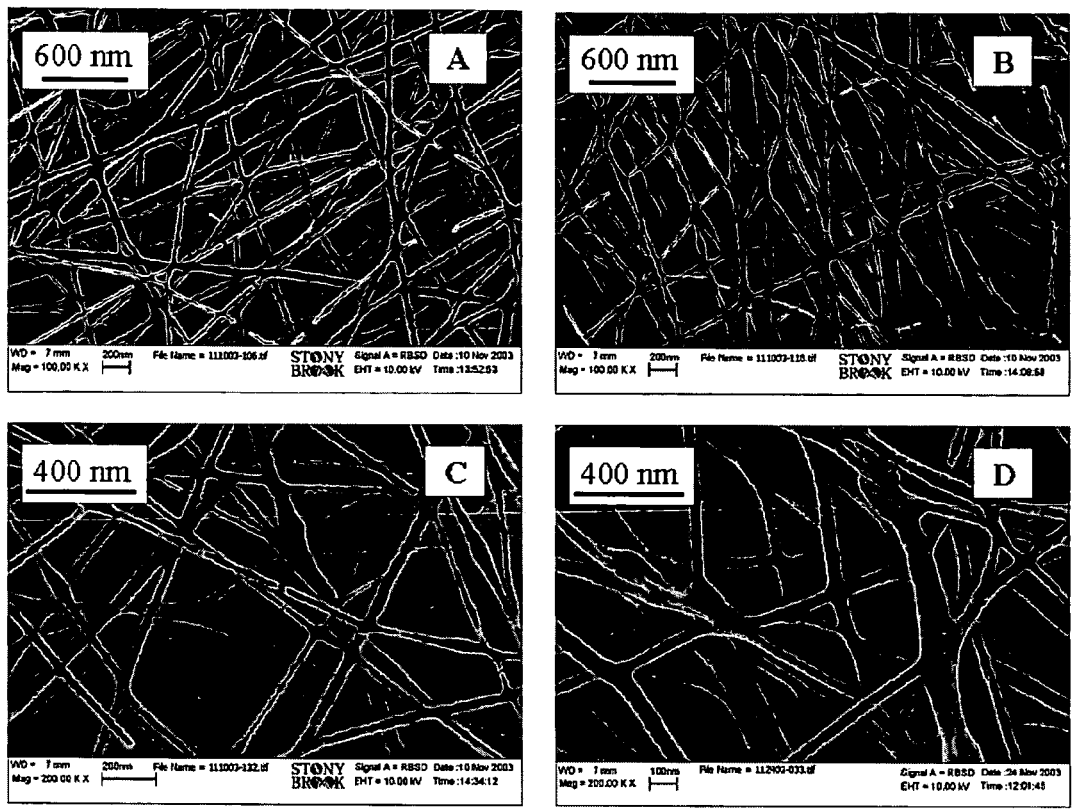
FIGS. 3(a)-(d) show SEM images of electro-spun HA membranes treated with HCl vapor for 3 minutes (at a height of 5 cm from HCl solution) from HCl aqueous solutions at different HCl concentrations of: (a) 29, (b) 24, (c) 20 and (d) 26% (w/v)

FIG. 2 shows that the partial pressure of HCl increases rapidly when the HCl concentration is higher than 30% (w/v). Therefore, for the following experiments, we chose the HCl concentration in the range of 20~30% (w/v) in order to provide a milder HCl-vapor treatment.

b) Influences of HCl Vapor Treatment and Freezing Condition on the Cross-Linking of Electro-Spun HA Membranes FIG. 3 shows the SEM images of electro-spun HA membranes treated with HCl vapor for 3 minutes (height: 5 cm) using more diluted HCl aqueous solutions at different HCl concentrations: (a) 29, (b) 24, (c) 20 and (d) 26% (w/v). We could see that the fibers were kept intact and that there was no big difference in the surface morphology of HA membranes after the HCl-vapor treatment by exposing the membrane at lower HCl vapor pressures.

Figure 4:
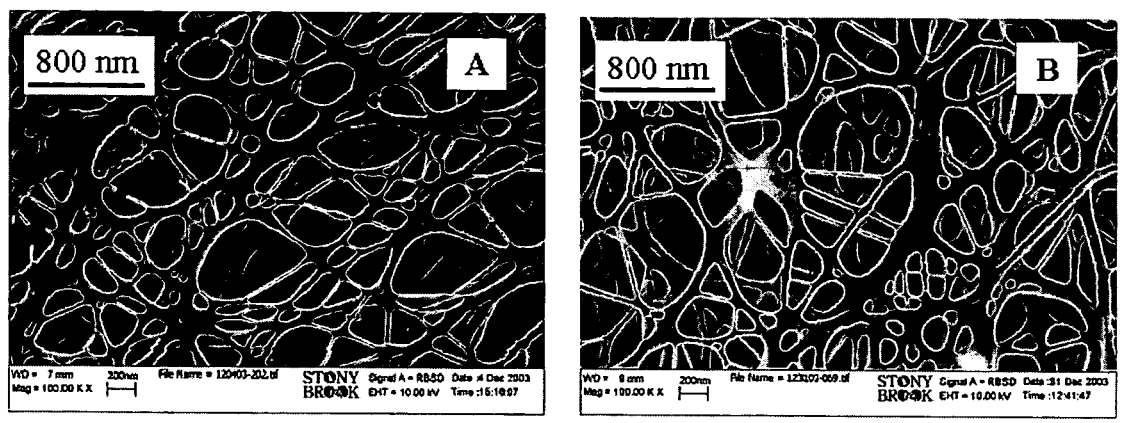
FIGS. 4(a) and 4(b) show SEM images of electro-spun HA membranes: (a) treated by 24% (w/v) HCl aqueous solution for 3 min and then kept at −20° C. for 25 days; and (b) treated by 20% (w/v) HCl aqueous solution for 3 min and then kept at −20° C. for 40 days.

After the HCl-vapor treatment, the electro-spun HA membranes were kept in covered bottles in the freezer at −20° C. for weeks. FIG. 4 shows the SEM images of electro-spun HA membranes based on the HCl-vapor treatment. Samples in FIG. 4 can swell in Mill-Q water and become transparent. The swollen HA membranes will not disappear in water for more than one week, but they do become very soft and difficult to pick up from the aqueous fluid.

Figure 5:
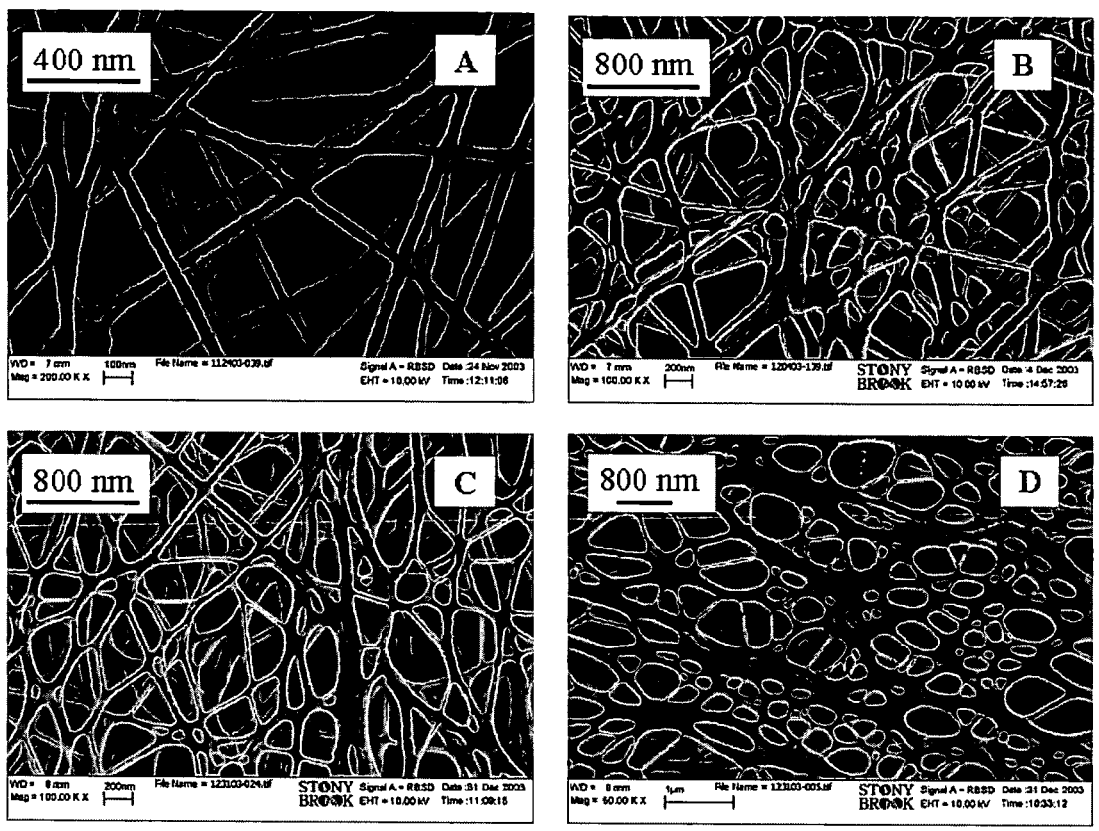
FIGS. 5(a)-(d) show SEM images of electro-spun HA membranes treated with HCl vapor from 26% (w/v) aqueous solution (with the membrane at a height of about 8 cm from the liquid surface) for 10 min (a, b and c) and 25 min (d), then kept at −20° C. for: (a) 0 day; (b) 10 days; (c) 35 days; and (d) 35 days.

FIG. 5 shows the SEM images of HA samples treated for different time periods in HCl-vapor and kept in a freezer at −20° C. For the sample with longer HCl-vapor exposure time, the membrane could keep its shape and did not swell much in the translucent state in Mill-Q water, suggesting a higher degree of cross-linking. However, its mechanical property remained very weak as the membrane could break into pieces when being handled.

The above results indicate that the cross-linking of electro-spun HA membranes can be performed by HCl vapor treatment. However, the desired mechanical strength has not yet been achieved.

2. Cross-Linking of Electro-Spun HA Membranes by Ethanol/HCl/$H_2O$ Mixture Treatment The cast film of HA has been chemically cross-linked with glutaraldehyde[19] or water-soluble carbodiimide[20] in ethanol or acetone-water mixtures. The organic solvent content in the mixture was at least 65 vol % in order to prevent the dissolution of HA. In the following experiments, we tried to "cross-link" the HA membrane in acidic ethanol-water mixtures, i.e., the presence of sufficient amounts of ethanol to prevent the dissolution of HA in the ethanol/water mixture, the presence of sufficient amounts of HCl to destabilize HA, and the cooling of the mixture to slow down the reaction.

a) Ethanol/$H_2O$ (pH 1.5)

Figure 6:
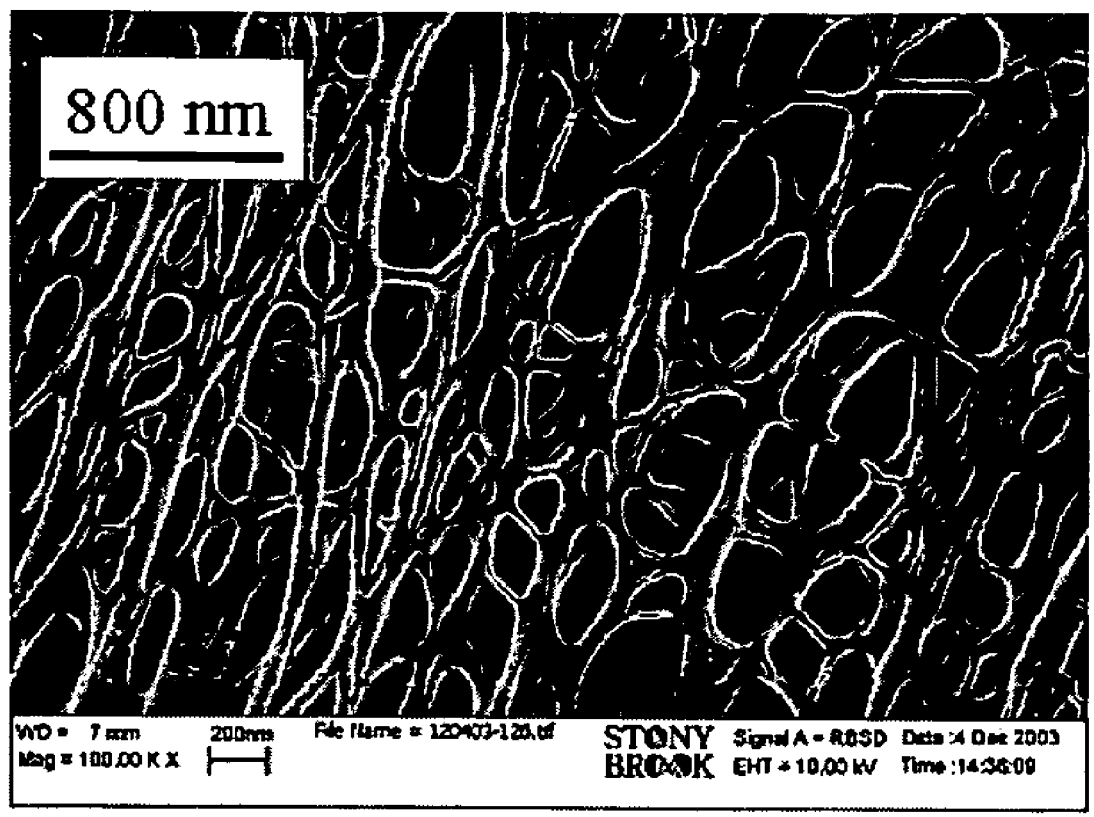
FIG. 6 shows an SEM image of HA membrane soaked in 80/20 ethanol/$H_2O$ (pH ~1.5) for 2 days at 4° C.

By using the ethanol/$H_2O$ (pH 1.5) solution treatment, the volume percent of ethanol varied from 65 to 80 vol % and the soaking temperatures were −20° C., 4° C. and 20° C., with time treatment varied from one day to one month. The fibrous structure was relatively intact for thus treated membranes (FIG. 6), but the membranes could be dissolved in about one second in neutral water. Thus, the acid content in the mixture was increased as shown in (b) below.

b) Ethanol/HCl (37% (w/v)) Mixture

Figure 7:
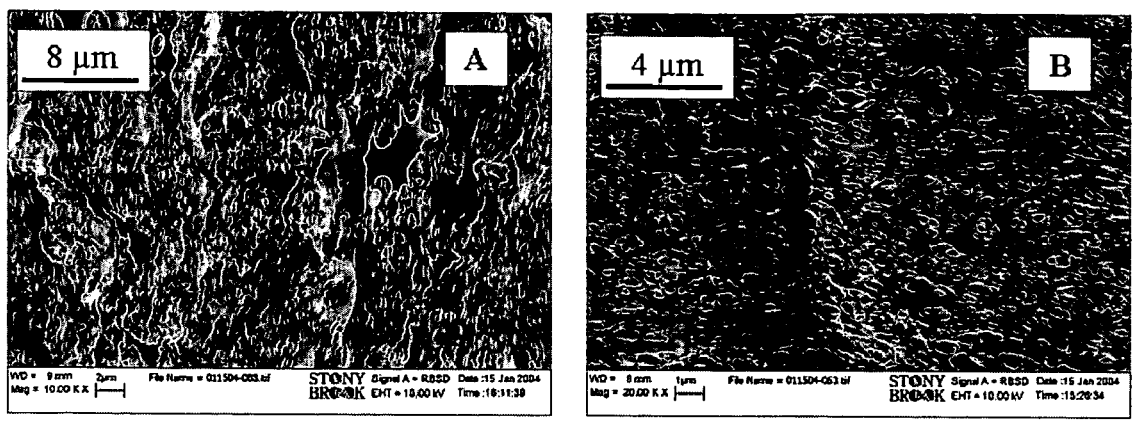
FIGS. 7(a) and 7(b) show SEM images of HA membrane soaked in: (a) 3:1 Ethanol/HCl mixture for 60 hrs at 4° C.; (b) 5:1 Ethanol/HCl mixture for one hour, then kept at −20° C. for 60 hrs.

In this case, the volume ratios of ethanol and 37% (w/v) HCl were 3:1, 4:1, and 5:1. The electro-spun HA membranes were immersed into the above ethanol-37% (w/v) HCl mixtures and kept at different temperatures for different time periods. FIG. 7 shows the SEM images of HA membranes soaked in the ethanol/HCl/HA mixture and then kept at different temperatures.

Figure 8:
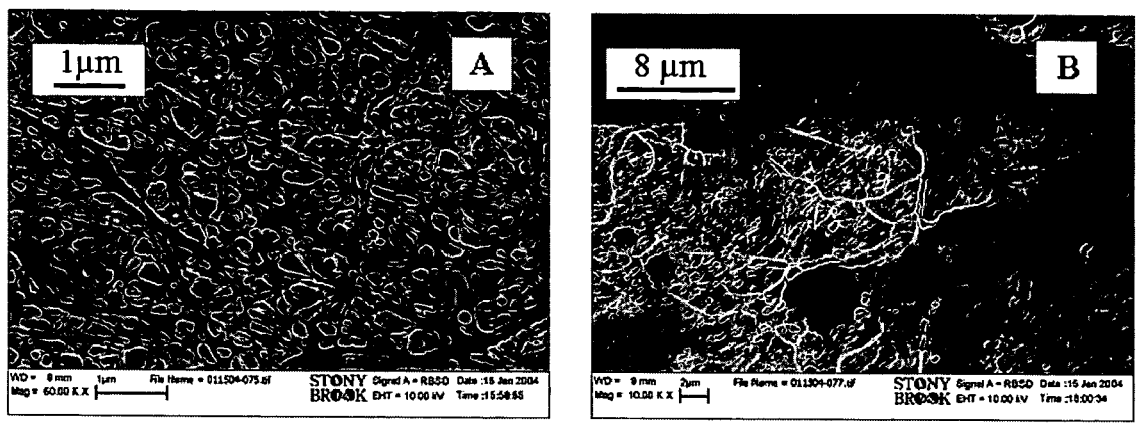
FIGS. 8(a) and 8(b) show SEM images of HA membrane: (a) soaked in 3:1 Ethanol/HCl mixture for one hour, then heated in the oven at 40° C. for 20 minutes; (b) soaked in 5:1 Ethanol/HCl mixture for one hour, then heated in a microwave oven for 1 minute.

In another set of experiments, HA membranes were soaked in the ethanol/HCl mixture, and the membranes were taken out and heated in an oven or a microwave oven with minutes. The SEM results are shown in FIG. 8.

All samples treated by this very strong acidic ethanol/HCl mixture showed some degree of crosslinking. These treated membranes could float on the surface of water for minutes before immersing into the liquid. The cross-linking of HA membranes was still relatively weak even when treated by using strong acidic ethanol/HCl (37% (w/v)). It should be noted that the slightly swollen HA nano-fibers in the non-woven membrane could probably not yet be fully exposed in the strong acid solution. Thus, the cross-linking reaction has not been fully initiated in the interior of those fibers.

c) Ethanol/37% (w/v) HCl/$H_2O$

In this set of experiments, extra water was introduced into the ethanol/37% (w/v) HCl mixture. Different ratios (3:1, 4:1, 5:1) in the ethanol/37% (w/v) HCl mixed solution were mixed with water. The three component mixture was checked continuously by dropping one small piece of electro-spun HA membrane until the HA membrane changed from complete dissolution to no significant shrinkage. The contents of ethanol, $H_2O$ and HCl were then calculated as shown in Table 1. The electro-spun HA membranes were immersed into the above prepared three component mixture at different temperatures (−20° C., 4° C., 20° C.) for different time periods.

Figure 9:
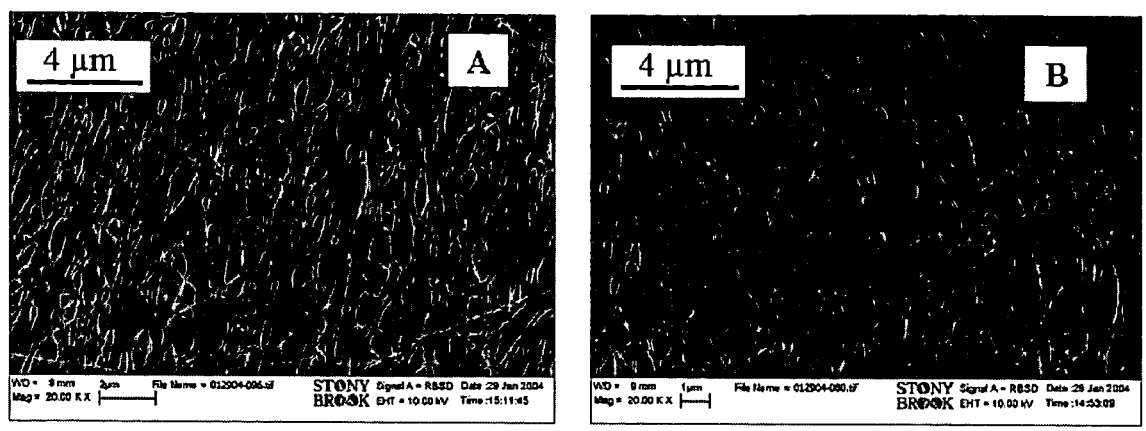
FIGS. 9(a) and 9(b) show SEM images of HA membrane treated by: (a) '1-mL $H_2O$+17-mL 3:1 Ethanol/HCl (37% (w/v))' at 4° C. for 16 hrs; (b) '2-mL $H_2O$+15-mL 4:1 Ethanol/HCl (37% (w/v))' at 4° C. for 20 hrs.
Figure 10:
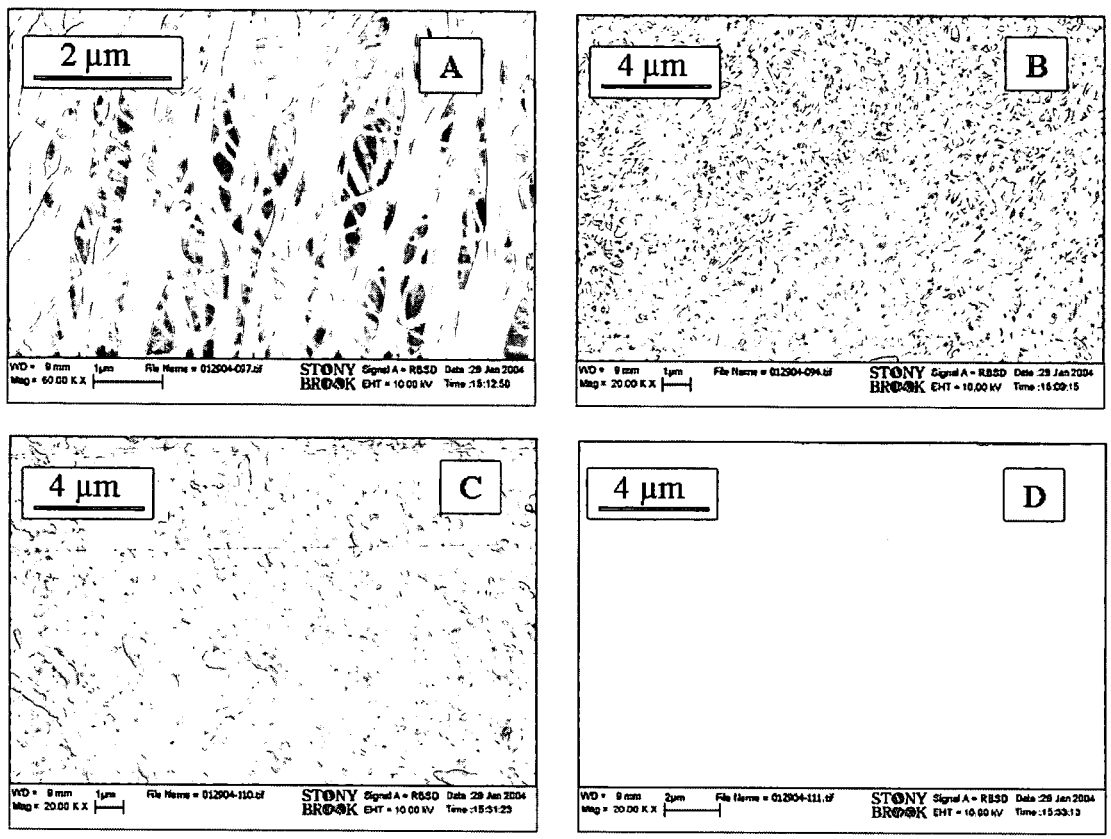
FIGS. 10(a)-(d) show SEM images of HA membrane treated by '2-mL H2O+15-mL 4:1 Ethanol/HCl at 4C for 20 hrs: (a) sample dried by filter paper; (b) soaked in water for 5 min; (c) soaked in water for 10 min; and (d) soaked in water for one day.

It was found that such prepared membranes were well cross-linked in the mixture of '3:1 ethanol/HCl+$H_2O$' and '4:1 ethanol/HCl+$H_2O$' at 4° C., as shown in FIG. 9. The cross-linked membrane could keep its shape intact in neutral water for at least one week at 25° C. The cross-linking of samples treated by '5:1 ethanol/HCl+$H_2O$' mixture at 4° C. was a little weaker whereby the films became transparent in neutral water. FIG. 10 shows the SEM images of HA membranes treated by '$H_2O$+Ethanol/HCl' mixture and then soaked in neutral water for different time periods. By treating the samples with $H_2O$/ethanol/HCl mixture at −20° C. or at 20° C., the HA membrane would still be dissolved fairly fast in water if the sample was treated in $H_2O$/ethanol/HCl mixture at −20° C. and for periods even longer than one week, indicating that the cross-linking reaction could not occur substantially when the sample was treated in the mixture at low temperatures (e.g., −20° C.). For the sample treated at 20° C., the mechanical property of HA membrane was very weak and broke into pieces when soaked in neutral water for several hours, implying that the strong acid would destroy the fibers at higher temperatures (e.g., at 20° C.).

For the content of ethanol in the mixture, it should be about 71 vol %. The HA membrane would dissolve or shrink significantly if the ethanol content were a little lower than 71 vol %. The water content should be about 24 vol %. If the water content was lower than 23 vol %, there would not have been enough water to ensure the membrane to be sufficiently swollen and the cross-linking of HA membranes would be less resistant to water dissolution.

TABLE 1

Component contents in the ethanol/HCl/$H_2O$ mixture

| | (EtOH/37% (w/v) HCl)/$H_2O$ (ml/ml) | | |
|---|---|---|---|
| | (3:1) 34/2 | (4:1) 16/2 | (5:1) 17/2 |
| HCl (wt % (w/v)) | 11.7 | 8.9 | 7.6 |
| Ethanol (vol % (v/v)) | 70.8 | 71.1 | 74.6 |
| $H_2O$ (vol % (v/v)) | 23.4 | 24.6 | 21.8 |

3. IR Spectroscopy

Figure 11:
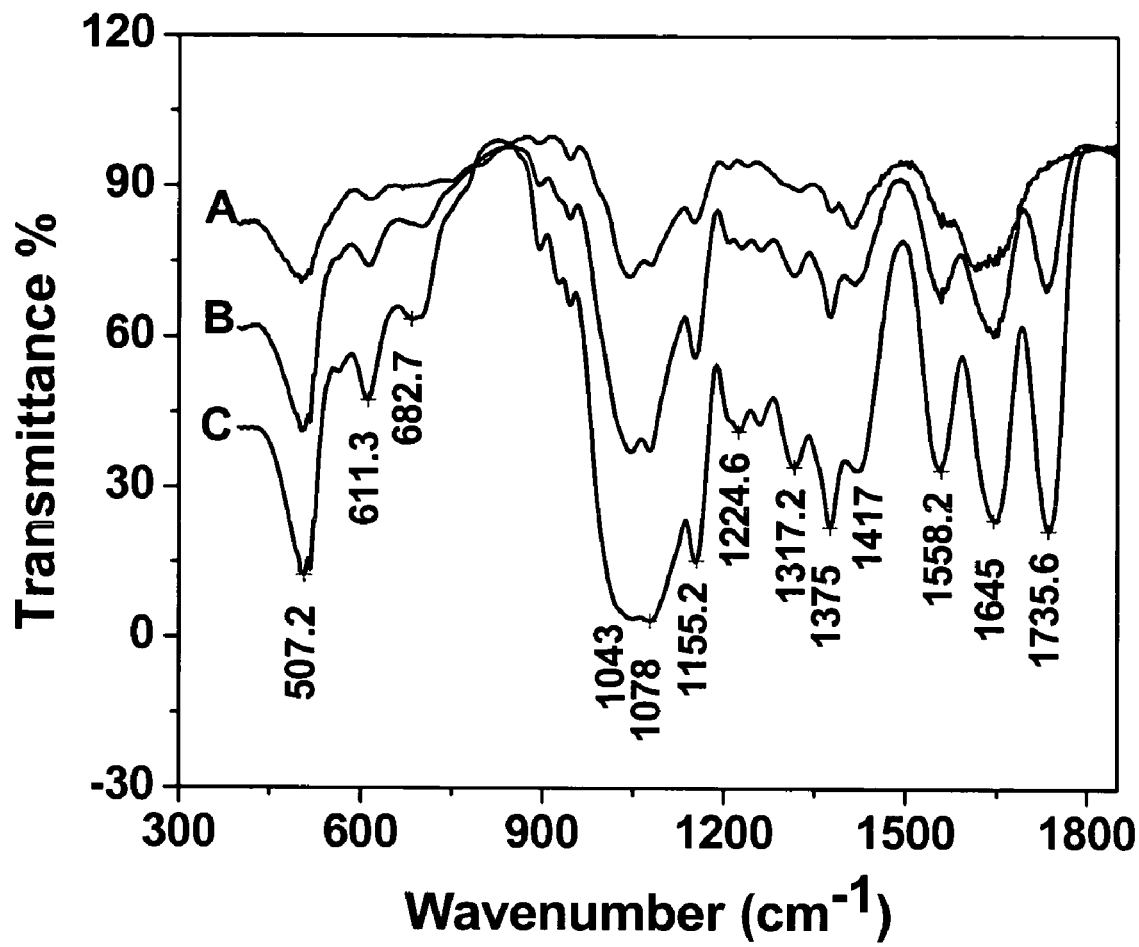
FIG. 11 FTIR spectra of: A) HA powder; B) electrospun HA membrane before cross-linking; C) cross-linked electrospun HA membrane by acidic ethanol/$H_2O$ mixtures.

FTIR spectroscopy was conducted on the electrospun membranes before and after cross-linking. The results are shown in FIG. 11 for the HA powder, electrospun HA membranes before and after treatment in acidic condition. The representative bands can be assigned as follows: the intense group of bands extending from 1500 to 1800 $cm^{-1}$ are superpositions of amide I and II bands and of various carbonyl and carboxyl $v_{C=O}$ bands. The bands extending between 950 and 1100 $cm^{-1}$ are mainly resulted from different vibrations of the pyranose ring, corresponding to $v_{C-OH}$. The shoulder at 1155 $cm^{-1}$ can be assigned to $v_{C-O-C}$. As seen in FIG. 11 (A and B), no appreciable difference can be observed in the IR spectra between the virgin powder and the electrospun HA membrane before treatment, except for the change due to the ion exchange of carboxyl group in HA (from 1600 to 1645 and 1735 $cm^{-1}$) from —COO$^-$Na$^+$ to —COOH induced by HCl. Comparing the IR spectra (FIG. 11 (B and C)) of electrospun HA membrane before and after cross-linking under acidic environment, no new peak appeared and no peak shifted could be identified. However, the peaks at 1043 and 1078 $cm^{-1}$, corresponding to $v_{C-OH}$, were changed from sharp to blunt. This phenomenon is believed to be attributed to the hydrogen bond of C—OH being strongly enhanced by acid treatment. The results from the IR spectra indicated that the cross-linking of HA in the nanofibrous membrane is probably due to the formation of a hydrogen-bonding network among the chains, leading to an absence of change in the chemical structure, at least from the IR spectroscopic perspective.

4. Viscosity Changes of Acidic HA Aqueous Solution After Freezing

As reported previously, when acidic HA solution was allowed to freeze at −20° C. and followed by the thawing process, insoluble HA gel could be obtained. In the present work, we tried to find out the optimal freezing time for acidic HA solution under which the viscosity of HA solution could be increased significantly but in the absence of gel formation. The acidic HA aqueous solution was frozen at −20° C. for different time period. After freezing, the frozen samples were thawed at room temperature. The final solutions after thawing were transparent similar to that of the starting solution, if the freezing time was no more than 6 hours. However, if freezing time was longer than 8 hours, the final solution after thawing looked like putty, indicating the onset of gel formation. Spongy gels were obtained when the freezing time was longer than 40 hours.

Figure 12:
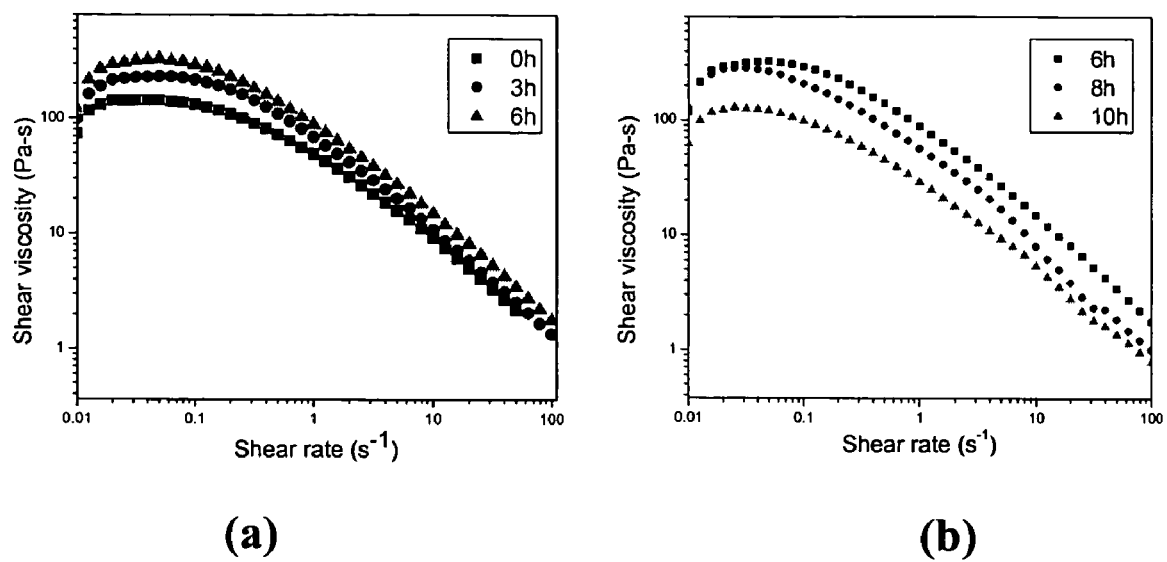
FIG. 12 is a graphical representation of the effect of freezing time on the shear viscosity of 1.6% (w/v) HA solution at pH 1.5.
Figure 13:
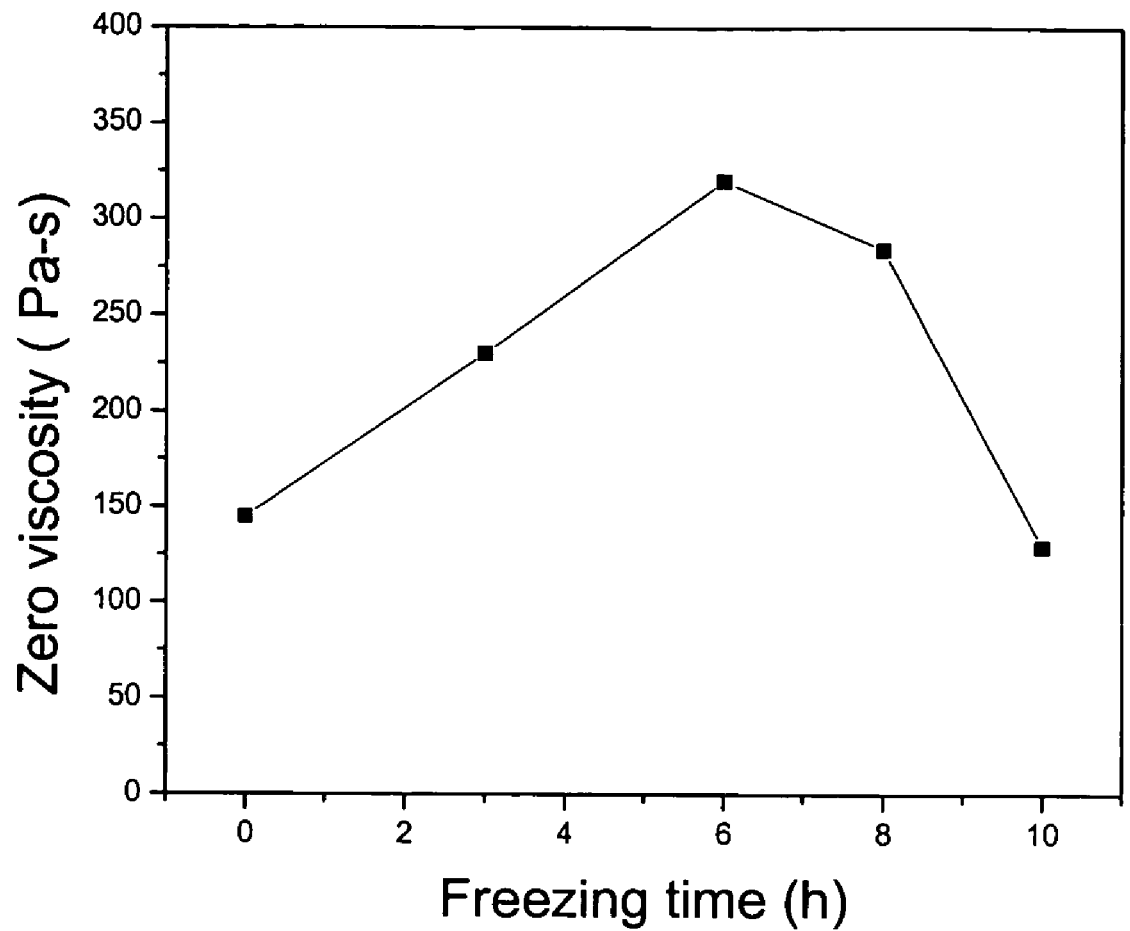
FIG. 13 is a graphical representation showing the extrapolated zero shear viscosity of acidic HA solution versus freezing time.

The shear viscosity of thawed HA solution after freezing for different time periods increased with increasing of freezing time from 0 to 6 hrs. The measured apparent shear viscosity then decreased for the samples frozen for more than 8 hours, as shown in FIG. 12. The reason for this phenomenon was that gel particles began to appear in the HA solution after having been frozen for more than 8 hours. The inhomogeneous solution could result in a lower viscosity. FIG. 13 shows the relationship between the extrapolated zero-shear viscosity of the acidic HA solution and the freezing time. We can see that the zero-shear rate viscosity of HA solution increased after a short freezing time period and then decreased with further freezing time. This result indicated that after the 6-hour freezing time period, the acidic HA solution was slightly cross-linked and its viscosity increased significantly with the solution still remaining in a homogeneous solution state. Longer freezing times will result in the formation of cross-linked HA gel and the occurrence of micro-gel particle formation after thawing.

Figure 14:
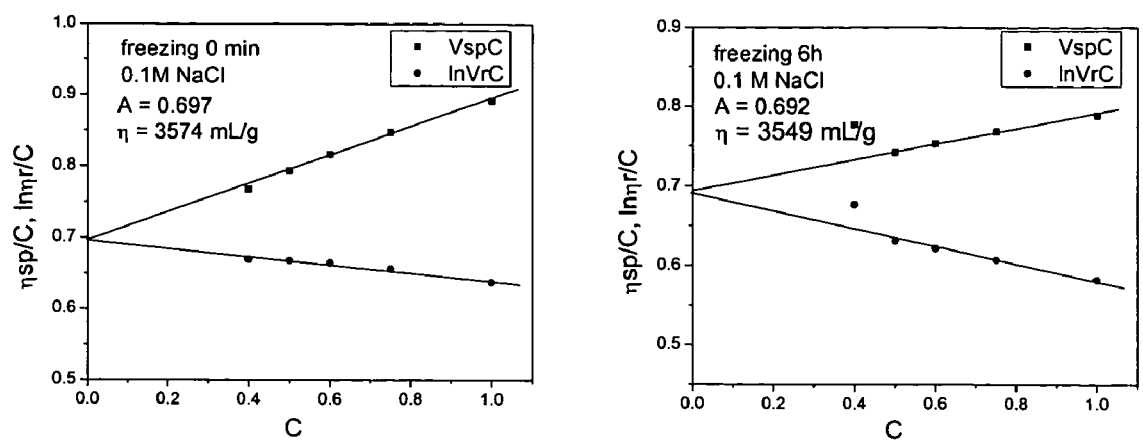
FIG. 14 is a graphical representation showing the relationship between $\eta_{sp}/C$, $\ln(\eta_r/C)$ and relative concentration C of dilute HA solutions before and after freezing treatment.

With the cross-linking reaction occurring in acidic HA solution after a short time period of freezing (less than 6 hours), we tried to estimate the molecular weight changes after the freezing process were estimated by viscosity measurements. When the thawed solution was neutralized with 0.2 M NaOH solution and then diluted with 0.1 M NaCl solution, the final solution was clear if the freezing time was lower than 6 hours. A substantial amount of gel-like particles would appear if the freezing time was longer than 8 hours. The intrinsic viscosity of diluted HA solution with 0.1M NaCl before and after 6 hours of freezing showed very similar values, as shown in FIG. 14, indicating the reversible nature of this weak cross-linking reaction caused by the freezing process upon dilution.

Figure 15:
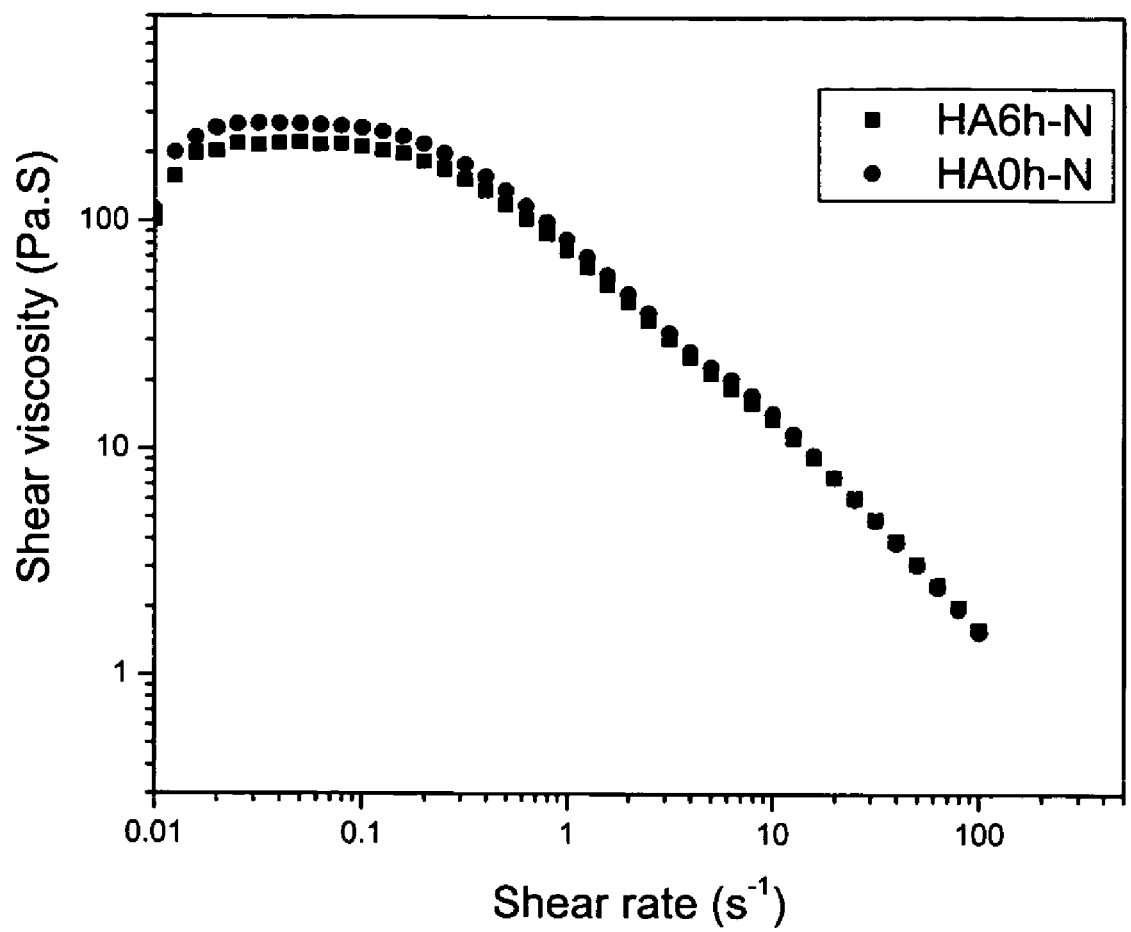
FIG. 15 is a graphical representation showing the shear viscosity of 1.5% (w/v) HA neutralized solution at freezing times of 0 h and 6 h.

FIG. 15 shows the shear viscosity of HA solution neutralized with 0.2 M NaOH solution after freezing and thawing processes against the shear rate for two samples frozen at −20° C. for 0 and 6 hours, respectively. By comparing the results with those in FIG. 12, it was found that, after neutralization, the viscosity of HA solution remained essentially the same before and after the freezing process, indicating that the cross-linking of HA solution came from relatively weak interactions, caused probably by hydrogen bonds. Such a cross-linking reaction is reversible upon neutralization and/or dilution. This finding is in agreement with Raman data.

Conclusions

1. In a most preferred embodiment, the cross-linking of electro-spun HA membranes has been achieved by simply immersing the membrane into an ethanol/$H_2O$/HCl mixture at 4° C. for about 20 hrs. In the mixture of this most preferred embodiment, both the contents of ethanol and of water are important for performing the most preferred embodiment of the cross-linking of electro-spun HA membranes. The ethanol content in the mixture should be most preferably about 71 vol %, ensuring that the membrane will not be dissolved or change its shape significantly. The water content should be most preferably about 24 vol %, ensuring the fibers in the membrane to be slightly swollen to allow the diffusion of HCl into the nanofibers in order for the cross-linking reaction to occur. The cross-linked membrane could keep its shape in neutral water for at least one week at 25° C.

2. The cross-linking of acidic HA solution upon freezing was studied by viscosity measurements. It was found that the viscosity of HA solution after the freezing-thawing process increased significantly when the freezing time was less than 6 hours. After neutralization/dilution processes, viscosity measurements showed that the slightly cross-linked HA had almost the same molecular weight as that of the original HA, indicating that the cross-linking of HA solution after freezing for short times was a very weak interaction caused probably by hydrogen bonds, and such a cross-linking reaction could be reversible upon neutralization and/or dilution of the concentrated HA solution. The HA solution became gel-like if the freezing time was longer than 8 hours.

Obviously, additional modifications and variations of the present invention are possible in light of the above teachings. It is therefore to be understood that within the scope of the appended claims, the invention may be practiced otherwise than as specifically described herein.

The invention claimed is:

1. A water resistant non-woven hyaluronan fibrous membrane having controlled void volume and mean pore size comprising:
    a fibrous matrix, which comprises water-resistant hyaluronan fibers with an average fiber diameter in the range about 0.005 to about 10.0 micrometers, the membrane having a porosity in the range of about 30 to about 95 percent void volume and a mean pore size in the range of about 0.01 to about 100.0 micrometers.

2. A water resistant non-woven hyaluronan fibrous membrane prepared by:
    forming an initial non-woven membrane of hyaluronan fibers by a process selected from the group consisting of electrospinning, electroblowing, blowing-assisted electrospinning and combinations thereof, and
    crosslinking the initial non-woven membrane of hyaluronan fibers, wherein the crosslinking is performed by a process comprising:
        contacting the initial non-woven membrane of hyaluronan fibers with an acidic solvent/water mixture for a period of time and at a temperature sufficient to effect crosslinking, wherein said acidic solvent/water mixture comprises a content of a solvent sufficient to prevent dissolution of said initial non-woven membrane of hyaluronan fibers and wherein said solvent is miscible with water, and an amount of an acid sufficient to effect crosslinking of the hyaluronan fibers in said initial non-woven membrane.

* * * * *